(12) United States Patent
Gresley

(10) Patent No.: US 8,387,485 B2
(45) Date of Patent: Mar. 5, 2013

(54) HAND OPERATED OVERRUNNING CLUTCH PARKING BRAKE ACTUATOR

(75) Inventor: Ross Gresley, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 303 days.

(21) Appl. No.: 12/755,696

(22) Filed: Apr. 7, 2010

(65) Prior Publication Data

US 2010/0257972 A1   Oct. 14, 2010

Related U.S. Application Data

(60) Provisional application No. 61/167,751, filed on Apr. 8, 2009.

(51) Int. Cl.
*G05G 1/04* (2006.01)

(52) U.S. Cl. .......................................................... 74/523

(58) Field of Classification Search .................. 74/501.6, 74/502.2, 502.3, 512, 523, 528, 543, 545; 384/569
See application file for complete search history.

(56) References Cited

U.S. PATENT DOCUMENTS

| | | | | |
|---|---|---|---|---|
| 3,011,606 A | * | 12/1961 | Ferris et al. | 192/45.008 |
| 5,448,928 A | * | 9/1995 | Harger | 74/523 |
| 5,907,977 A | * | 6/1999 | Huebner et al. | 74/501.5 R |
| 6,382,048 B1 | * | 5/2002 | Youn et al. | 74/529 |
| 7,574,943 B2 | * | 8/2009 | Wortmann | 74/512 |
| 8,025,129 B2 | * | 9/2011 | Gresley | 188/2 D |
| 2008/0041185 A1 | * | 2/2008 | Hanna et al. | 74/512 |

* cited by examiner

*Primary Examiner* — Vicky Johnson
(74) *Attorney, Agent, or Firm* — Lucas & Mercanti, LLP; Klaus P. Stoffel

(57) ABSTRACT

Parking brake actuator is an overrunning single directional clutch which provides for infinite locking positions.

10 Claims, 9 Drawing Sheets

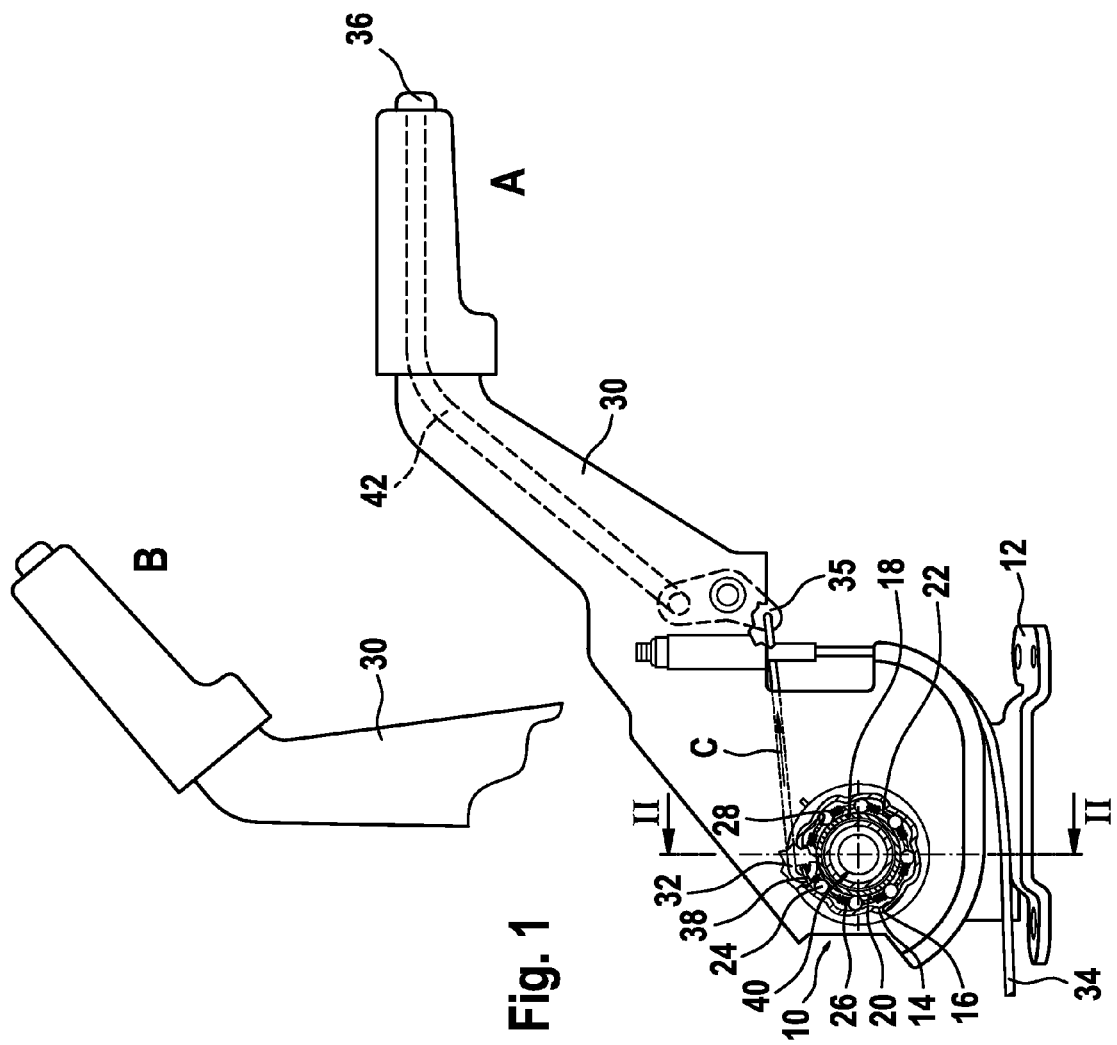

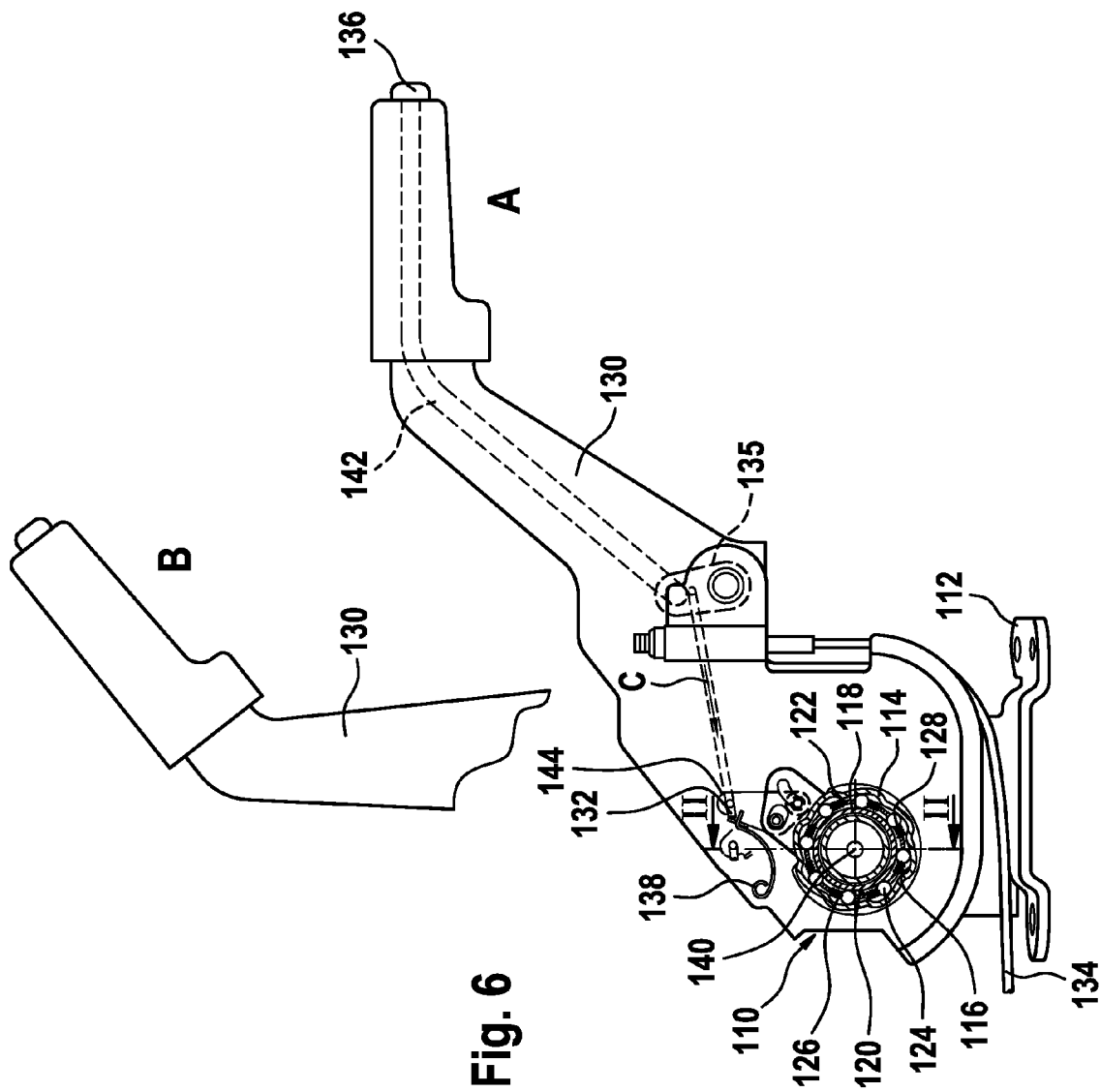

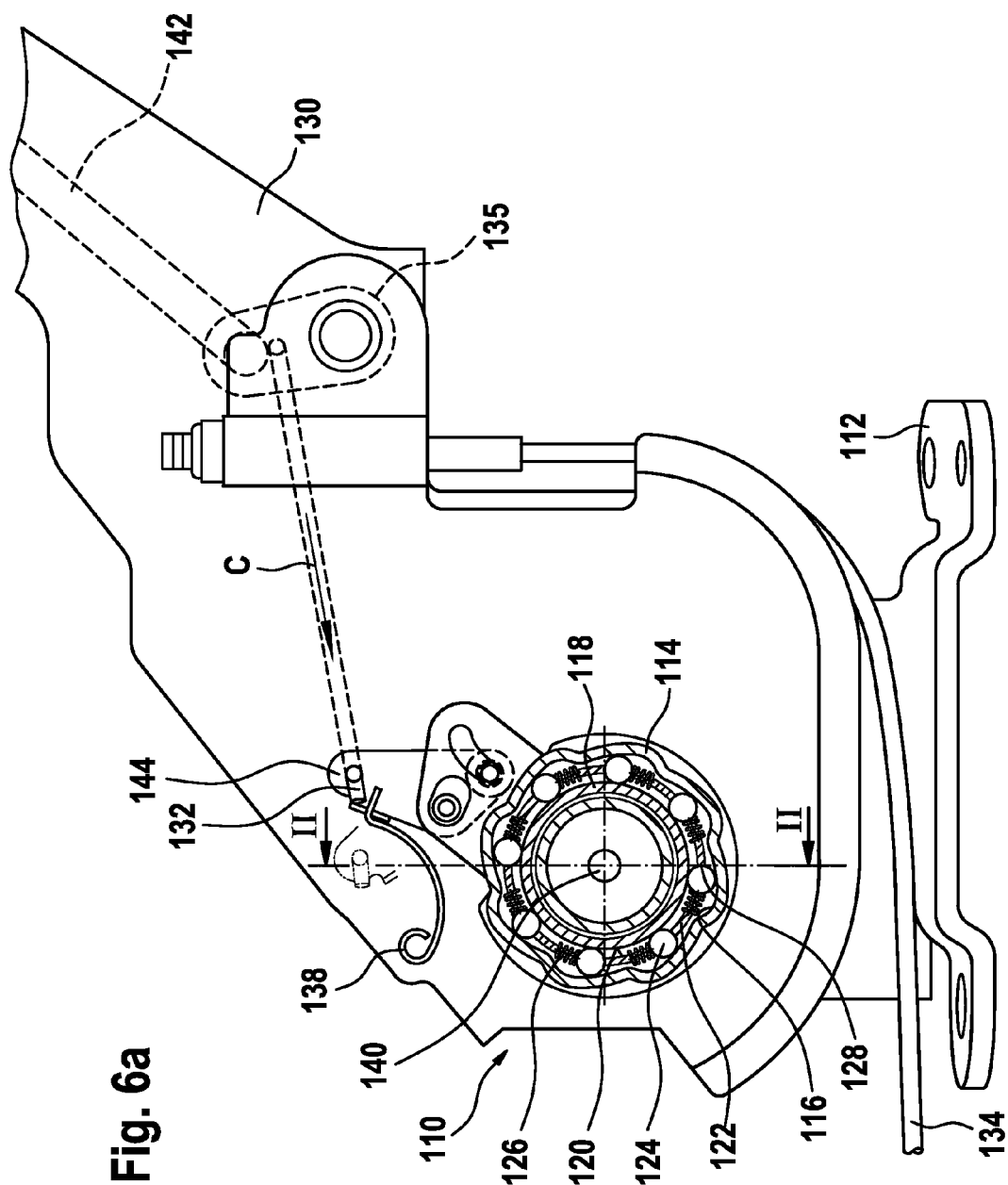

HAND OPERATED OVERRUNNING CLUTCH PARKING BRAKE ACTUATOR

FIELD OF THE INVENTION

This invention relates to motor vehicles, and more particularly to a hand operated parking brake actuator used in motor vehicles.

BACKGROUND OF THE INVENTION

Most motor vehicles have a manually operated parking brake which is operated by either a hand lever or a foot pedal. In a hand operated parking brake, the parking brake actuator is connected to a hand lever and to a cable which, in turn, is connected to the parking brake itself. The parking brake actuator sets the parking brake by pulling on the cable in response to someone pulling on the hand lever. The actuator applies tension to the cable to set the brake. Releasing the tension in the cable releases the parking brake. The actuator is released through moving the hand lever.

Conventionally, a parking brake actuator is either a ratchet-pawl mechanism, or a spring or tension spring-clutch mechanism.

The ratchet-pawl mechanism and the tension spring-clutch mechanism used for parking brake actuators have a number of drawbacks. Because a pawl and a ratchet are dependent upon tooth spacing for engagement, the operator must overtension the brake cable to avoid cable slack when setting the brake. Noise is also an issue as the pawl moves over the ratchet or sector gear as the operator sets the brake. The spring-clutch drawback is the large amount of tolerance in the mechanism resulting in a wide spread of tension on the brake cable. Breakage of the binding ends of the torsion spring is also a problem. Both of these actuators use several separate components to release the brake.

OBJECTS OF THE INVENTION

It is the object of this invention to provide an improved vehicle parking brake actuator of the type that is set by pulling the hand lever to pull the cable and employing a clamping mechanism which is mounted to a frame that is fixed in the vehicle. Further, it is the object of the invention to provide a parking brake release as part of the clutch mechanism to return the actuator to its retracted position. It is also the object of this invention to create such a clamping arrangement that is economical to build and mount within the vehicle and for which the parts and transportation costs are decreased.

These and other objects and advantages of the invention become more readily apparent from the following description.

SUMMARY OF THE INVENTION

The objects of the invention are obtained by using an overrunning clutch mechanism as a parking brake actuator. Such an overrunning clutch mechanism greatly simplifies the amount of components and reduces the cost associated with conventional parking brake actuators. The actuator of the invention is designed in such a way that the components can be formed from sheet metal parts made with chipless technology. This makes the actuator of the invention especially economical since it can be mass produced and there is no need for cleaning of chips or shavings. The actuator of the invention may be made through a drawing, stamping, rolling, or a combination of these processes. The actuator of the invention has all its components formed integrally into a complete module ready for installation with a parking brake hand lever and a mounting bracket for greatly simplifying the final assembly. The actuator of the present invention can be used as a single module which can then be applied in several different applications, thereby reducing the number of components needed. Since the actuator blocks at the same instant the wheel brake sets, the actuator of the invention eliminates overtensioning of the cable when setting the brake and also reducing the operator's effort to set the hand brake.

Broadly, the invention can be defined as a hand operated parking brake actuator comprising:

a mounting bracket for mounting to a vehicle;

a hand lever rotatably mounted to the mounting bracket and rotatable about an axis, the hand lever affixable to a parking brake cable to set and release the parking brake;

an outer sleeve fixed to the hand lever, extending axially outward from the hand lever and coaxial with the axis, the outer sleeve having a plurality of inner bearing ramps;

an inner sleeve fixed to the mounting bracket, mounted coaxial with and inside the outer sleeve, the inner sleeve having an outer bearing surface that radially opposes the inner bearing ramps of the outer sleeve;

a plurality of cam rollers mounted in a cage, the cage coaxial with and rotatably mounted between the inner and outer sleeve, the cam rollers spring biased against the inner bearing ramps and the outer bearing surface, the cage rotatable between three positions, a set position where the rollers are held intimately between the inner bearing ramps and the outer bearing surface, a release position where the rollers are free between the inner bearing ramps and the outer bearing surface, and a start position;

a return spring which returns the cage from the release position to the start position, the return spring having a release position and a start position one end of the return spring fixed to the outer sleeve and the other end of the return spring acting on the cage; and a release button on the hand lever which actuates the return spring and the cage to the released position, and the hand lever rotates and moves the cage between the set position and the start position so as to set and release the parking brake.

Preferably, the brake actuator of the invention further comprises a center shaft that is fixed to the outer sleeve and the hand lever and is rotatably mounted to the mounting bracket. The shaft extends axially outward from the mounting bracket and is coaxial with the axis. The inner sleeve, the outer sleeve and the cage are mounted in a coaxial manner about the shaft.

The hand lever rotates the outer sleeve, the return spring and the cage with the cam rollers in two directions, clockwise, to the start position and counter clockwise to the set position. In the start position the brake is released.

The return spring is preferably a circular return spring coaxially mounted about the inner sleeve with one end secured to the outer sleeve and the other end secured to the cage. The return spring urges the cage relative to the outer sleeve to position the rollers in tight contact with the inner bearing ramps of the outer sleeve and the outer bearing surface of the inner sleeve to set the brake, when the cage is in the set position and the start position. Thus, the return spring is in the start position when the cage is in the set position and start position. In other words, the return spring stays in the same position relative to the cage and the outer sleeve in both the cage set and start position.

Alternatively, the return spring is secured at one end to the lever and at the other to a release bell crank.

Preferably, the release button is connected by a link to a bell crank which, in turn, is connected by a rod to the other end of a return spring and to the cage. The return spring and the cage are held in a release position by pushing the release button when the hand lever is pulled to rotate the outer sleeve counter clockwise. In the release position, the force of the return spring on the cage is removed, the cage is held in the release position and the cage is free to rotate with the lever as it rotates the cage to the start position. Once the button is released the return spring is free to act on the cage and rotate the cage counterclockwise from the release position to the start position.

Each roller is biased by a compression spring. The rollers can be balls or cylindrical in shape.

Alternatively, the release button is connected by a link to a bell crank which is connected by a rod to a release bell crank which, in turn, is connected to a return spring and an outer sleeve. Pushing in the release button causes the bell crank to rotate in a conventional manner and move the rod to the left. The rod then rotates the release bell crank such that outer sleeve is rotated counterclockwise to a release position. In the release position, the force of the return spring on the release bell crank is removed, the release bell crank is held in the release position and the rollers and lever can rotate clockwise from the release position to the start position.

BRIEF DESCRIPTION OF THE DRAWINGS

These and other aspects of the present invention may be more readily understood by reference to one or more of the following drawings:

FIG. 1 is the brake actuator of the invention with the rollers and the return spring in the start position;

FIG. 6 is an alternate embodiment of the brake actuator of FIG. 1;

FIG. 6a is an enlarged view of the brake actuator of FIG. 6; and

DETAILED DESCRIPTION OF THE DRAWINGS

Figure 1A:
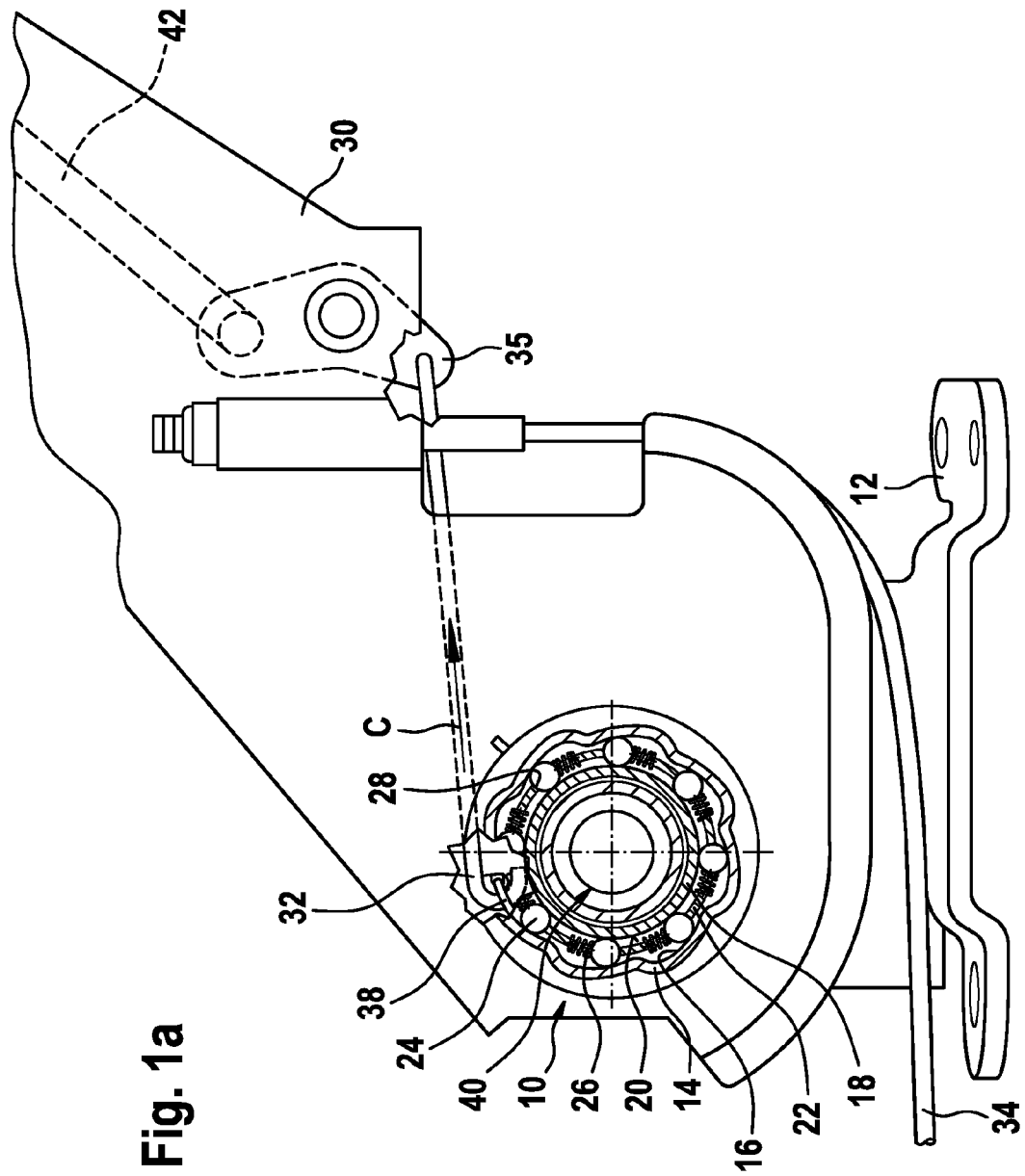
FIG. 1a is an enlarged view of the brake actuator of FIG. 1.

Turning to FIG. 1, parking brake actuator 10 is illustrated. Parking brake actuator 10 has mounting bracket 12 to which inner sleeve 18 is affixed. Outer sleeve 14 is affixed to lever 30. Outer sleeve 14 has a plurality of inner bearing ramps 16. Inner sleeve 18 is positioned coaxially inside outer sleeve 14 and fixed to bracket 12. Inner sleeve 18 has an outer bearing surface 20. Positioned between outer sleeve 14 and inner sleeve 18 is cage 22.

Cage 22 has rollers 24 spring biased by spring 26 into tight contact with bearing surfaces 16 and 20. FIG. 1 illustrates the start position for rollers 24, cage 22 and return spring 38. Each roller 24 is positioned in pocket 28 of cage 22 and biased with spring 26.

Lever 30 is connected to parking brake cable 34.

Figure 4:
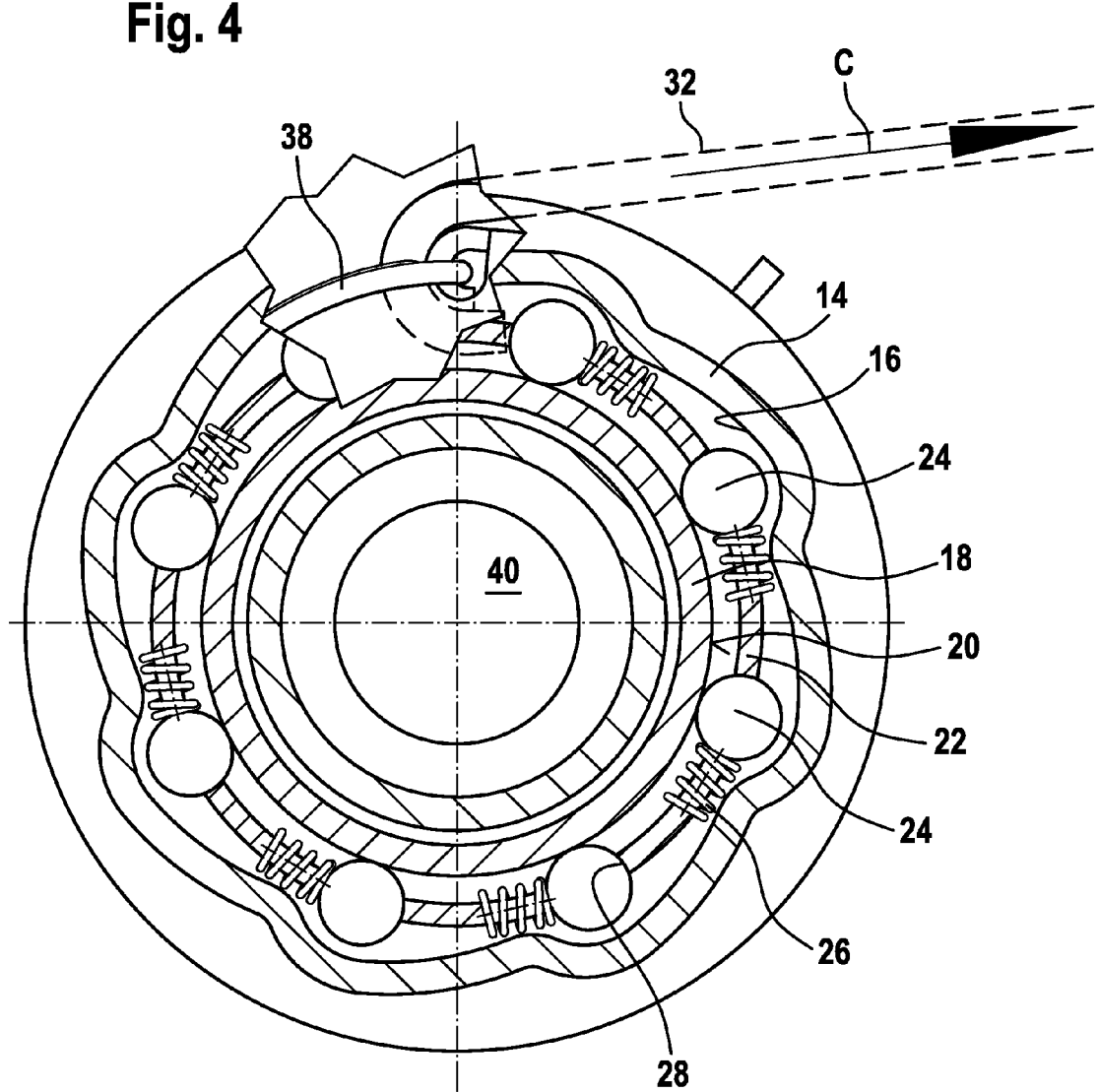
FIG. 4 illustrates the actuator with the rollers and the return spring in the release position.

One end of rod 32 is connected to and acts on return spring 38, the other end of rod 32 is connected to bell crank 35. Bell crank 35 is connected by link 42 to release button 36. Pushing in release button 36 (position B in FIG. 1) causes bell crank 35 to rotate in a conventional manner and move rod 32 to the right (see arrow C). Rod 32 then pulls spring 38 in a clockwise direction releasing the force applied by spring 38 on cage 22 and holding cage 22 in position. By pulling lever 30 upward a small amount, cage 22 and rollers 24 are in the released position as shown in FIG. 4. Lever 30 can then rotate clockwise from position B to position A.

Position A illustrates parking brake cable 34 in a start position while position B shows parking brake cable 34 in a set position where parking brake cable 34 has been tensioned to set the parking brake in the parked position. Circular return spring 38 has one end secured to outer sleeve 14 and the other end secured to cage 22. Finally, center shaft 40 is illustrated as affixed to lever 30 and rotatably fixed to mounting bracket 12 and extending outward therefrom. Outer sleeve 14, cage 22 and lever 30 rotate with center shaft 40.

Figure 2:
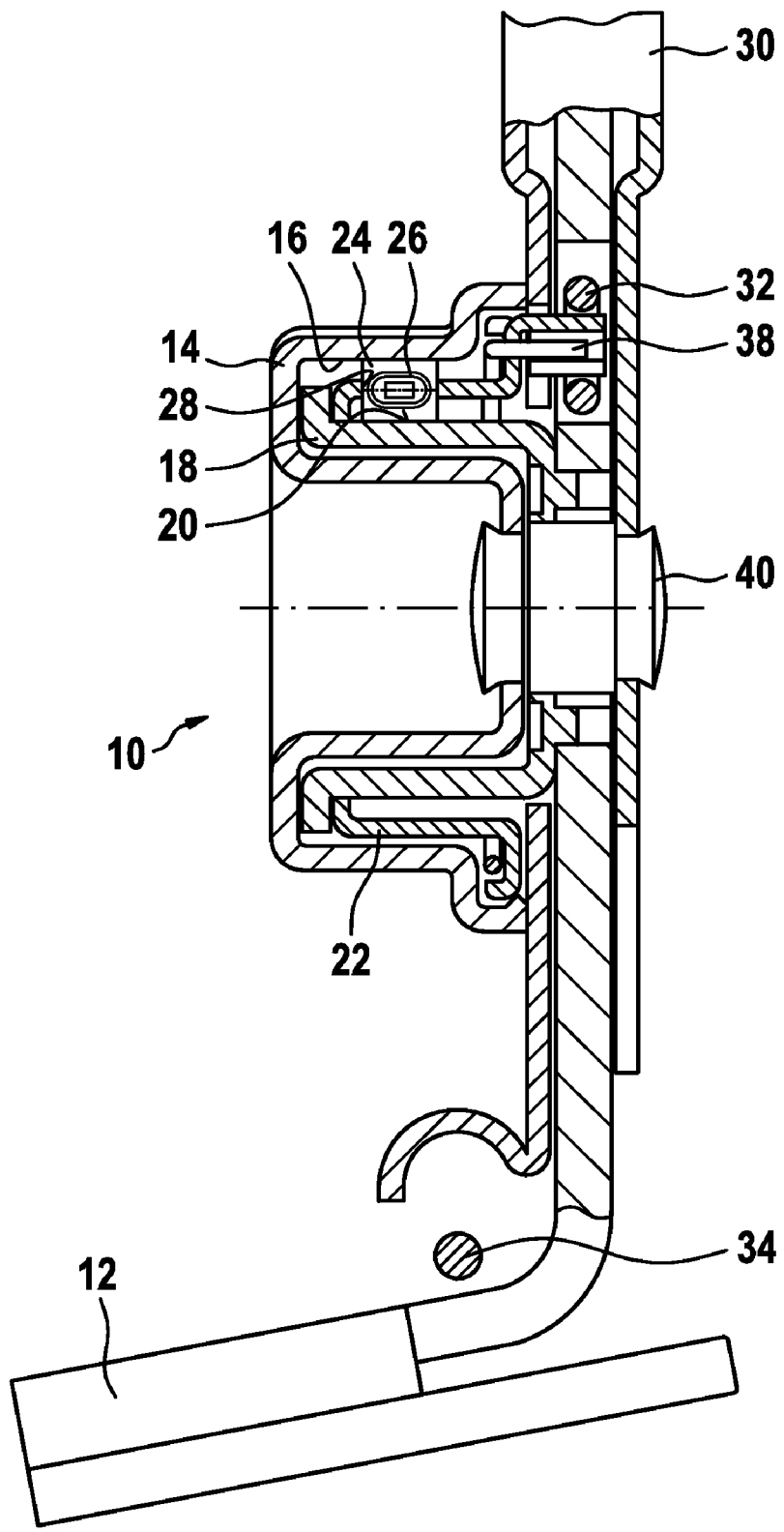
FIG. 2 is a cross-section of the actuator of FIG. 1 taken along lines II-II.

FIG. 2 illustrates parking brake actuator 10 in cross-section along lines II-II of FIG. 1. As can be seen in FIG. 2, rollers 24 are shown as cylindrical.

Outer sleeve 14 is affixed to hand lever 30 and extends axially outward from hand lever 30.

Figure 3:
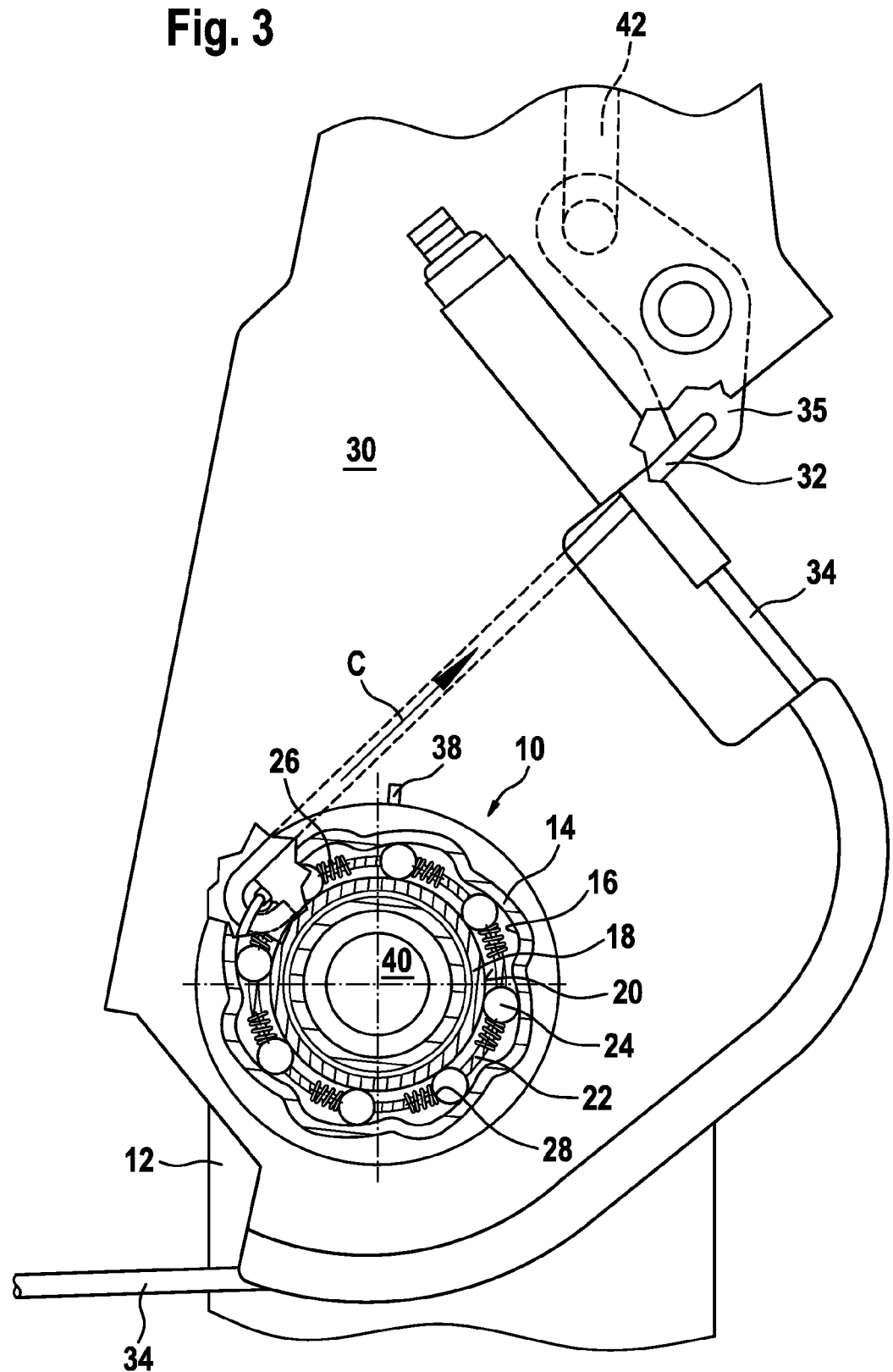
FIG. 3 illustrates the actuator 1 with the rollers in the set position.

FIG. 3 illustrates actuator 10 of FIG. 1 when lever 30 is pulled to position B and parking brake cable 34 is set. FIG. 3 illustrates actuator 10 with rollers 24 in the set position where lever 30 has been rotated from position A (start) to position B (set) (see FIG. 1) and rotates cage 22 counterclockwise thereby rotating roller 24 to a position between inner bearing ramps 16 and outer bearing surface 20 where rollers 24 are in intimate contact with ramps 16 and surface 20. In this set position, lever 30 can not rotate in a clockwise direction due to the force exerted on rollers 24 by inner bearing ramps 16 and outer bearing surface 20. This sets the parking brake.

To release the parking brake, the user initially pulls upward on lever 30, and simultaneously pushes and holds down release button 36. Return spring 38 is linked to release button 36 by rod 32, bell crank 35 and link 42 (see FIG. 1). Then lever 30 is rotated clockwise from position B to position A (see FIG. 1). As the user holds down release button 12 and rotates lever 30 upward, counterclockwise, outer sleeve 14 rotates counter clockwise, but cage 22 and return spring 38 are held and rollers 24 are freed from tight contact between surfaces 16 and 20. This places both return spring 38 and cage 22 in the release position. Then, lever 30 is moved downward, clockwise, to position A. This clockwise motion also rotates cage 22 and the unblocked (free) rollers 24 to the start position. Returning the parking brake to the start position releases the tension in parking brake cable 34.

When lever 30 is in position A, release button 36 is released which, in turn, allows return spring 38 to rotate cage 22 counter clockwise and move cage 22 from the released position shown in FIG. 4 to the start position shown in FIG. 1.

Figure 5:
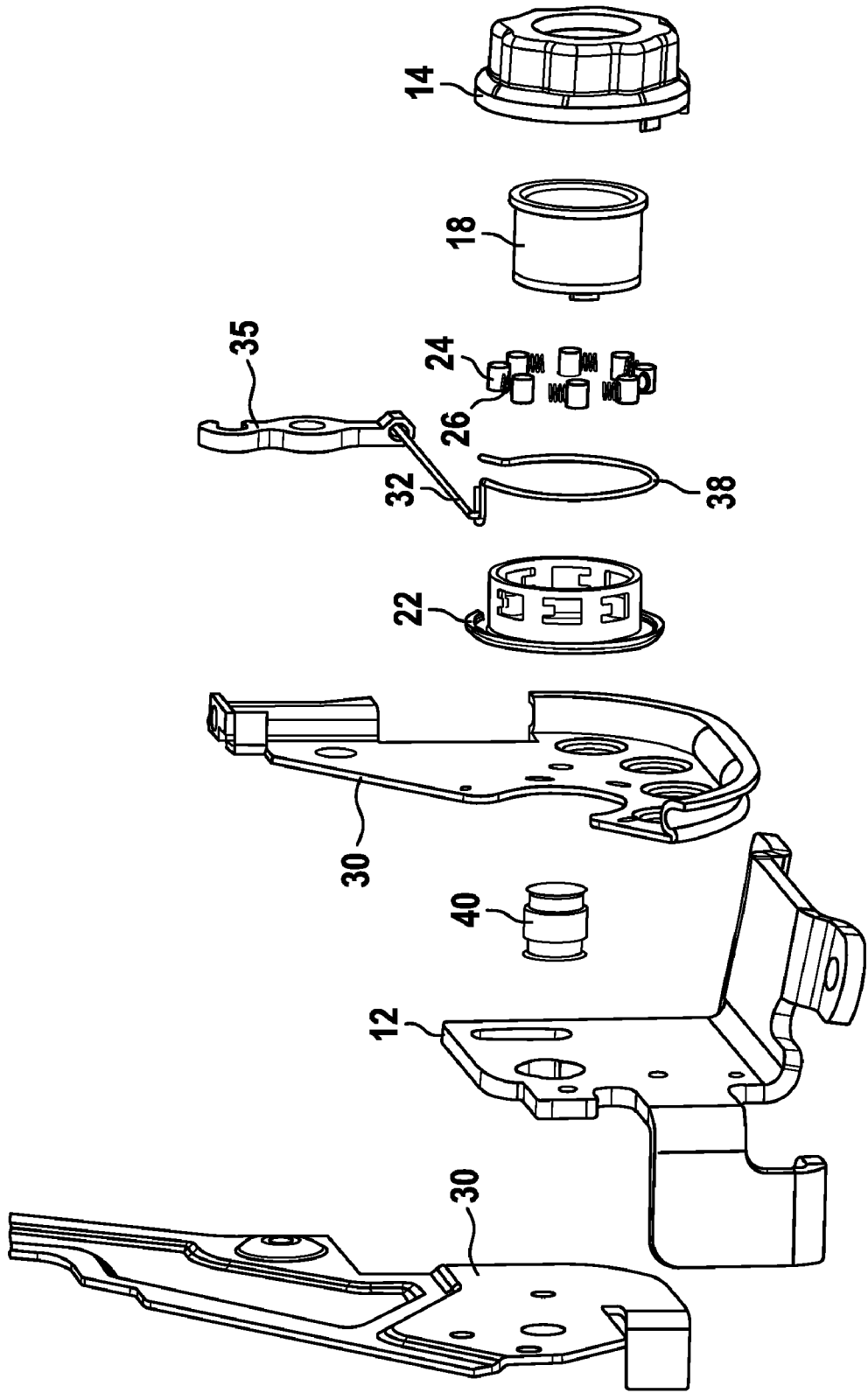
FIG. 5 is an exploded view of the actuator.

FIG. 5 shows an exploded view of actuator 10 of FIG. 1 of the present invention.

FIG. 6 illustrates parking brake actuator 110. Parking brake actuator 110 has mounting bracket 112 to which inner sleeve 118 is affixed. Outer sleeve 114 is rotatably mounted to center shaft 140. Outer sleeve 114 has a plurality of inner bearing ramps 116. Inner sleeve 118 is positioned coaxially inside outer sleeve 114 and fixed to bracket 112. Inner sleeve 118 has an outer bearing surface 120. Positioned between outer sleeve 114 and inner sleeve 118 is cage 122.

Cage 122 has rollers 124 spring biased by spring 126 into tight contact with bearing surfaces 116 and 120. FIG. 6 illustrates the start position for rollers 124, cage 122 and return spring 138. Each roller 124 is positioned in pocket 128 of cage 122, and biased with spring 126.

Lever 130 is connected to parking brake cable 134.

One end of rod 132 is connected to release bell crank 144, the other end of rod 132 is connected to bell crank 135. Release bell crank 144 is rotatably mounted to hand lever 130 and is acted upon by rod 132 and return spring 138. Bell crank 135 is connected by link 142 to release button 136. Pushing in release button 136 (position B in FIG. 1) causes bell crank 135 to rotate in a conventional manner and move rod 132 to the left (see arrow C). Rod 132 then rotates release bell crank 144 such that outer sleeve 114 is rotated counterclockwise to an unblock position. In this unblock position the rollers 124 are in the released position and lever 130 can then rotate clockwise from position B to position A.

Position A illustrates parking brake cable 134 in a start position while position B shows parking brake cable 134 has been tensioned to set the parking brake in the parked position. Return spring 138 has one end secured to lever 130 and the other end secured to release bell crank 144. Finally, center shaft 140 is illustrated as affixed to mounting bracket 112 with hand lever 130 rotatably mounted to center shaft 140.

Figure 7:
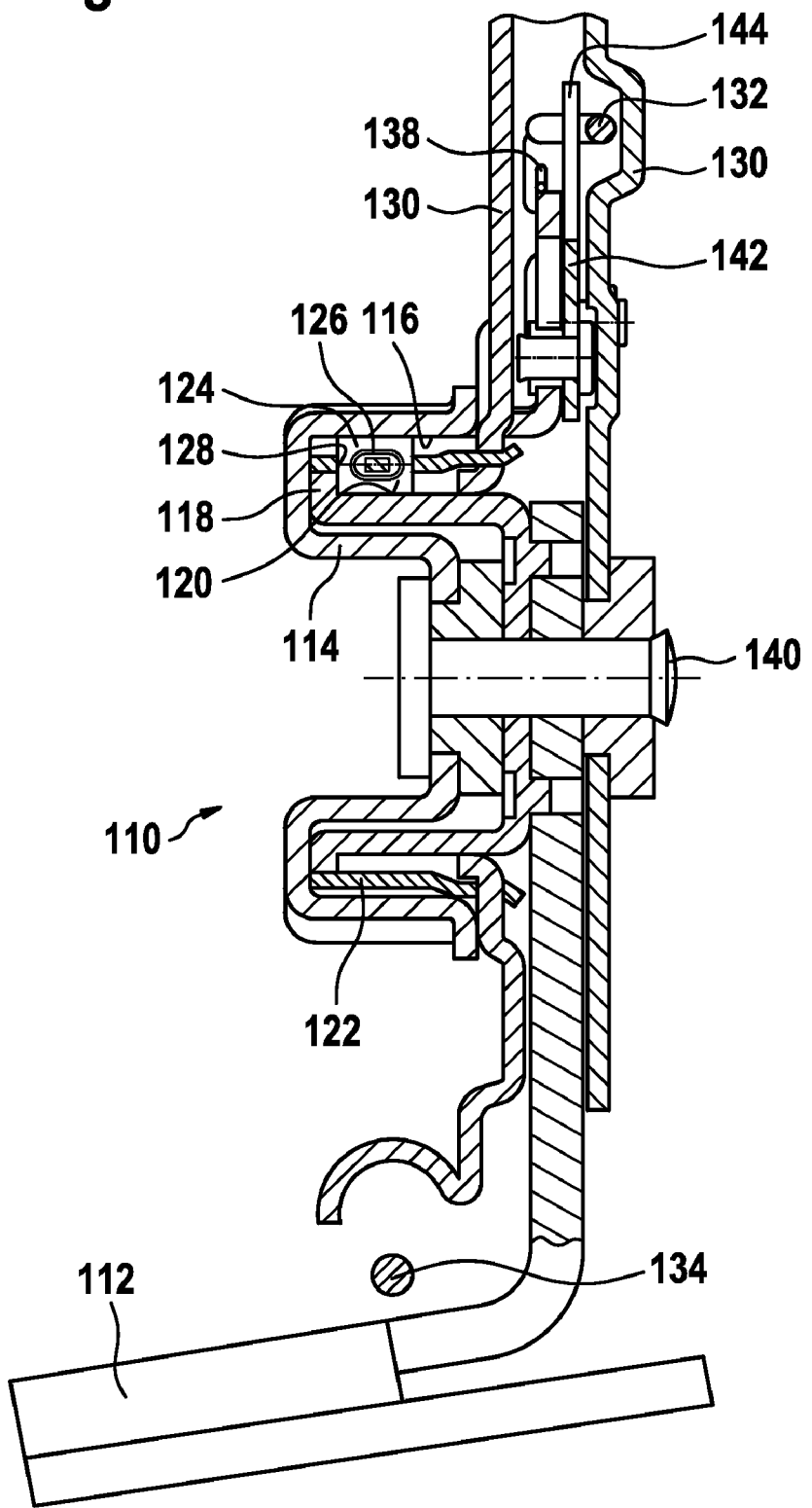
FIG. 7 is a cross-section of the actuator of FIG. 6 taken along lines II-II.

FIG. 7 illustrates parking brake actuator 110 in cross-section. As can be seen in FIG. 7, rollers 124 are shown as cylindrical.

Outer sleeve 114 is rotatably mounted to center shaft 140 and extends axially outward from hand lever 130.

The set position of the actuator in this second embodiment is similar to FIG. 3 of the first embodiment, and the release position of the actuator in this second embodiment is similar to FIG. 4 of the first embodiment.

REFERENCE CHARACTERS

10 Parking Brake Actuator
12 Mounting Bracket
14 Outer Sleeve
16 Inner Bearing Ramp
18 Inner Sleeve
20 Outer Bearing Surface
22 Cage
24 Rollers
26 Spring
28 Pocket
30 Lever
32 Rod
34 Parking Brake Cable
35 Bell Crank
36 Release Button
38 Circular Return Spring
40 Center Shaft
42 Link
110 Parking Brake Actuator
112 Mounting Bracket
114 Outer Sleeve
116 Inner Bearing Ramp
118 Inner Sleeve
120 Outer Bearing Surface
122 Cage
124 Rollers
126 Spring
128 Pocket
130 Lever
132 Rod
134 Parking Brake Cable
135 Bell Crank
136 Release Button
138 Return Spring
140 Center Shaft
142 Link
144 Release Bell Crank

The invention claimed is:

1. A hand operated parking brake actuator, which is rotatable about an axis of rotation, comprising:
    a mounting bracket for mounting to a vehicle;
    a hand lever rotatably mounted to the mounting bracket and rotatable about the axis of rotation, the hand lever affixable to a parking brake cable to set and release the parking brake;
    an outer sleeve fixed to the hand lever and extending axially outward from the hand lever and coaxial with the axis, the outer sleeve having a plurality of inner bearing ramps;
    an inner sleeve fixed to the mounting bracket and mounted coaxial with and inside the outer sleeve, the inner sleeve having an outer bearing surface that radially opposes the inner bearing ramps;
    a plurality of cam rollers mounted in a cage, the cage coaxial with and rotatably mounted between the inner and outer sleeve, the cam rollers are spring biased against the inner bearing ramps and the outer bearing surface, and the cage is rotatable between three positions, a set position where the rollers are held intimately between the inner bearing ramps and the outer bearing surface, a release position where the rollers are free between the inner bearing ramps and the outer bearing surface, and a start position;
    a return spring which returns the cage from the release position to the start position, the return spring having a release position and a start position, one end of the return spring fixed to the outer sleeve and the other end of the return spring acting on the cage; and
    a release button on the hand lever which actuates the return spring and the cage to the released position, and the hand lever rotates and moves the cage between the set position and the start position so as to set and release the parking brake,
    wherein the mounting bracket has an upper surface which is orientated perpendicular to the axis of rotation of the actuator such that the hand lever is rotatably mounted perpendicular to the upper surface of the mounting bracket.

2. The actuator of claim 1, further comprising a center shaft fixed to the hand lever and the outer sleeve, extending axially outward from the mounting bracket and about which the inner sleeve and the outer sleeve and the cage are mounted in a coaxial manner, the lever, the outer sleeve, and the cage rotatable with the center shaft.

3. The actuator of claim 1, wherein the rollers are, biased by compression springs.

4. The actuator of claim 1, wherein the rollers are cylindrical.

5. The actuator of claim 1, wherein the return spring is a circular spring coaxially mounted about the inner sleeve with one end secured to the outer sleeve and the other end secured to the cage.

6. A hand operated parking brake actuator, which is rotatable about an axis of rotation, comprising:
    a mounting bracket for mounting to a vehicle;
    a hand lever rotatably mounted to the mounting bracket and rotatably about an axis, the hand lever affixable to a parking brake cable to set and release the parking brake;
    an outer sleeve rotatably mounted to the hand lever and extending axially outward from the hand lever and coaxial with the axis, the outer sleeve having a plurality of inner bearing ramps;

an inner sleeve fixed to the mounting bracket and mounted coaxial with and inside the outer sleeve, the inner sleeve having an outer bearing surface that radially opposes the inner bearing ramps;

a plurality of cam rollers mounted in a cage, the cage fixed to the hand lever coaxial with and mounted between the inner sleeve and the outer sleeve, the cam rollers are spring biased against the inner bearing ramps and the outer bearing surface, and the cage is rotatable with the hand lever between three positions, a set position where the rollers are held intimately between the inner bearing ramps and the outer bearing surface, a release position where the rollers are free between the inner bearing ramps and the outer bearing surface, and a start position;

a release bell crank, which is rotatably mounted to the hand lever and is acted upon by a rod and a return spring, the rod is connected to the release bell crank and the other end of the rod is connected to a bell crank, the bell crank is fixed to the rod and a link, the return spring, which returns the outer sleeve from the release position to the start position, has a release position and a start position, one end of the return spring fixed to the lever and the other end of the return spring fixed to and acting on the release bell crank; and a release button on the hand lever which is connected to the link and actuates the bell crank, the rod, the release bell crank, the return spring and the outer sleeve to the released position, and the hand lever rotates and moves the outer sleeve between the set position and the start position so as to set and release the parking brake.

7. The actuator of claim 6, further comprising a center shaft fixed to the mounting bracket and inner sleeve, extending axially outward from the mounting bracket and about which the inner sleeve and the outer sleeve and the cage are mounted in a coaxial manner, the lever, the outer sleeve, and the cage rotatable about the center shaft.

8. The actuator of claim 6, wherein the rollers are biased by compression springs.

9. The actuator of claim 6, wherein the rollers are cylindrical.

10. The actuator of claim 6, wherein the mounting bracket has an upper surface which is orientated perpendicular to the axis of rotation of the actuator such that the hand lever is rotatably mounted perpendicular to the upper surface of the mounting bracket.

* * * * *